(12) United States Patent
Takeuchi

(10) Patent No.: US 7,130,535 B2
(45) Date of Patent: Oct. 31, 2006

(54) CAMERA SYSTEM WITH FLASH CONTROL BASED ON FOCAL LENGTH

(75) Inventor: Hiroshi Takeuchi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 92 days.

(21) Appl. No.: 10/968,141

(22) Filed: Oct. 20, 2004

(65) Prior Publication Data
US 2005/0147404 A1     Jul. 7, 2005

(30) Foreign Application Priority Data
Oct. 23, 2003   (JP)   .............................. 2003-362643

(51) Int. Cl.
G03B 15/02     (2006.01)
G03B 15/03     (2006.01)
(52) U.S. Cl. ........................................ 396/61; 396/157
(58) Field of Classification Search .................. 396/61, 396/157, 159
See application file for complete search history.

(56) References Cited

U.S. PATENT DOCUMENTS 5,231,447 A     7/1993   Takagi ........................ 354/415
5,848,304 A *  12/1998  Ikemura ....................... 396/77
6,327,434 B1 * 12/2001  Okumura et al. ............. 396/62

FOREIGN PATENT DOCUMENTS

JP     2003-666504     3/2003

* cited by examiner

Primary Examiner—Christopher Mahoney
Assistant Examiner—Chia-how Michael Liu (57) ABSTRACT

When the focal length of a photographic lens is less than a first focal length, a dimming correction amount deltaY is set to a certain minus value (deltaYW=−WddY) (S100, S150). When the focal length is greater than a second focal length, the dimming correction amount deltaY is set to a dimming correction amount deltaYT for a longer focus side (S110, S160). For the focal length falling between the first and second focal lengths, the dimming correction amounts deltaY is calculated with the deltaYW and the deltaYT being weighted and mixed according to focal-length information. Accordingly, even when a photographic lens having a short focal length is used, flashing can always be controlled stably with accuracy.

7 Claims, 6 Drawing Sheets

CAMERA SYSTEM WITH FLASH CONTROL BASED ON FOCAL LENGTH

CROSS-REFERENCE TO RELATED APPLICATIONS

This application is based upon and claims the benefit of priority from Japanese Patent Application No. 2003-362643, filed on Oct. 23, 2003, the entire contents of which are incorporated herein by reference.

BACKGROUND OF THE INVENTION

1. Field of the Invention

The present invention relates to a camera system which can emit a flash as supplemental illumination upon taking a photograph.

2. Description of the Related Art

Conventionally, the TTL auto flash scheme has been used to control the flashing device of a film camera of the monocular reflex type. Some of these film cameras emit a preflash prior to a main flash upon taking a photograph to measure reflected light from an object and thereby obtain information for the main flash.

On the other hand, digital cameras have an image sensor such as CCDs placed at the position of the photographic film, thus being dimmed with difficulty using light diffused on the surface of the image sensor. Accordingly, a well-known digital camera of the TTL auto flash type is employed. The camera emits a preflash prior to a main flash upon taking a photograph, measures reflected light from an object, calculates the flash amount required for the main flash in accordance with the measurement result of the preflash, and then emits the main flash with the calculated flash amount. Some of these digital cameras emit a preflash under mirror lockup to measure the reflected light of the preflash relative to the flux of light diffused on the surface of the shutter curtain. Based on this measurement result, it is calculated how many times the main flash amount should be greater than the preflash amount. Some other digital cameras allow a photometric sensor provided in the viewfinder optical system to measure the reflected light of the preflash under mirror lockdown and calculate the intensity of the main flash through computation for flashing at the resulting intensity.

Some of these film cameras employing the TTL auto flash and digital cameras are configured particularly to provide the information about the reflectance of an object in accordance with the measurement result of reflected light upon emitting a preflash and the object-distance information from the photographic lens or the focusing section to optimize the main flash amount. That is, what these cameras do first is obtain information about whether the object has a standard reflectance, a low reflectance, or a high reflectance. Then, in accordance with the information obtained, the cameras assign weights to divided dimming regions to calculate the main flash amount or control the dimming sensor.

Publication of Japanese Patent No. 3136658 (hereinafter denoted as Patent Document 1) describes a camera with a flash controlling device which employs the measurement result of reflected light upon emitting a preflash, the object-distance information, and the object-distance information detection error to determine the region used for dimming.

On the other hand, Japanese Unexamined Patent Application Publication No. 2003-66504 (hereinafter denoted as Patent Document 2) describes a camera which corrects the main flash amount in accordance with the measurement result of reflected light upon emitting a preflash, the object-distance information, and the object-distance information detection accuracy.

However, as described above, the following problems were found with the cameras which obtained information regarding the object reflectance from the measurement result of reflected light upon emitting a preflash and the object-distance information to assign weights to the dimming regions or calculate the dimming correction amount. That is, an error present in the object-distance information would lead to an error in the reflectance information, causing weights to be improperly assigned to the dimming regions. This would cause the dimming correction amount to be improperly calculated, thus resulting in an improperly set flash amount.

To obtain the object-distance information, a method is known which allows an encoder to detect the rotational position or the amount of rotation of the focusing ring of the photographic lens. Also known is such a method which employs defocus degree information detected by an auto focusing sensor.

However, the above-described methods do not directly measure distances, thus causing the resulting object-distance information to include a relatively significant error. In particular, a photographic lens with a short focal length is greater in depth of field than one with a longer focal length, thus providing a smaller rotational angle to the focusing ring relative to a change in photographic distance (object distance). Accordingly, when a photographic lens with a short focal length is used, the error included more significant which is contained in the object-distance information obtained from the rotational position of the focusing ring will be more significant.

When focus is achieved through auto-focusing, the error of the object-distance information also becomes significant because the object distance falls within a wider range for the same defocusing amount being allowed. For example, when all distances farther than a certain distance fall within the depth of field, no object-distance information is obtained on distances farther than that distance.

Furthermore, a wide angle lens with a short focal length provides lower optical image magnification, which often causes the object to be reduced in size. Accordingly, when a wide angle lens with a short focal length is employed with a bright portion present in the background, the auto focusing sensor is more likely to detect the bright portion in the background to focus the background. In this case, information on an object distance farther than the distance of the actual main object is output, causing the error to be more significant.

This point is considered in Patent Documents 1 and 2.

In Patent Document 1, the dimming region is determined using the object-distance information detection error stored in the photographic lens with the object-distance information. This object-distance information detection error is stored as information unique to the photographic lens in combination with the object-distance information. When the photometric value of reflected light in a region upon emitting a preflash is greater than or lower than a predetermined value based on the distance detection error, the region is not allowed to contribute to dimming. In other words, the region is excluded from contributing to the process of dimming. The wide angle lens prevents the region from being accidentally excluded according to the object-distance information having a significant error, because the region is not easily excluded. A region is not easily excluded because, when the object-distance information is on farther distance sides, detection errors are significant.

On the other hand, in Patent Document 2, the dimming correction amount is calculated as the reflectance correction value based on the preflash measurement result and the object-distance information. In this calculation, the method of calculating the reflectance correction value is changed with the product between the focal length and the optical image magnification employed as a parameter. That is, the correction can be readily made when the value of the product between the focal length and the optical image magnification is large (i.e., when the focal length is long and the photographic distance is short). On the contrary, when the product between the focal length and the optical image magnification is small (i.e., when the focal length is short and the photographic distance is long), the correction is made with greater difficulty. As described above, when the wide angle lens is employed and the photographic distance is relatively long, the object-distance information is expected to include a significant error. However, Patent Document 2 avoids making an inappropriate dimming correction based on erroneous object-distance information in the manner mentioned above.

As described above, both Patent Documents 1 and 2 employ the wide angle lens and provide control such that a positive corrections are not to be made using the object-distance information when the photographic distance is relatively long, thereby preventing improper control.

However, as described above, the wide angle lens has a large depth of field during the use of auto focusing, and falls within a wide distance range for the same amount of defocusing allowed, thus causing the stopping position of the lens focusing ring to vary within a certain range. In addition, in the presence of a brighter portion in the background as mentioned above, there is a high possibility that the background is focused because the portion may exert a stronger effect. This also raises a problem in the dimming level being varied.

Suppose that the lens stops at a relatively close distance side position of the focusing ring. In this case, the object-distance information corresponds to a short distance. In this case, according to the configuration of Patent Document 1, a relatively small value is output as the aforementioned object-distance information detection error, thus allowing a dimming region to be relatively easily excluded. Suppose that the lens stops at a relatively distant position of the focusing ring, and the same object as mentioned above (where the lens has stopped at a relatively close distance side position of the focusing ring) is photographed at the same distance. In this case, the object-distance information corresponds to a long distance, and the object-distance information detection error becomes significant, which makes the exclusion of the dimming region difficult.

Also, in Patent Document 2, when the lens has stopped at a relatively close distance side position of the focusing ring, the object-distance information indicates a value corresponding to a short distance with the optical image magnification being relatively large, thus allowing a correction to be readily made to the amount of dimming. However, when the lens has stopped at a relatively distant side position and the same object as mentioned above (where the lens has stopped at a relatively close distance side position of the focusing ring) is photographed at the same distance, the optical image magnification is decreased, which makes the correction of the amount of dimming difficult.

As described above, both the Patent Documents 1 and 2 have a problem in that the flash amount varies as a result of variations in stopping positions of the focusing ring.

Suppose that a scene of a man standing with no background is photographed using a wide angle lens. In this case, the area of the man is often small due to a reduced optical image magnification. Using the conventional TTL auto flash (the conventional technique of performing neither region exclusion or auto dimming correction as described in Patent Documents 1 and 2) to photograph such a scene would cause overexposure due to the reduced area of the object reflecting the illuminated light. To photograph such a scene, the flash amount would be appropriately set only if the region exclusion and the auto dimming correction as described in Patent Documents 1 and 2 work properly.

However, when the wide angle lens is used as described above, the stopping position of the lens varies significantly because of auto focusing, which causes large variations in the object-distance information obtained. Accordingly, the scene may be taken properly in some cases, whereas overexposure may be caused in other cases due to the region exclusion and the auto dimming correction not working properly. Thus, there was a problem in that use of a wide angle lens caused variations in the amount of dimming and, thus, resulted in unstable control.

SUMMARY OF THE INVENTION

It is an object of the present invention to offer a camera system which can provide stable and accurate control to flashing even when a photographic lens with a short focal length is used.

According to an aspect of the present invention, a camera system includes a light emitting section, a photometry section, a focal-length information detecting section, an object-distance information detecting section, and a main flash amount calculating section. The light emitting section is capable of emitting a preflash prior to a main flash upon taking a photograph. The photometry section is capable of measuring reflected light from an object upon emitting the preflash. The focal-length information detecting section detects focal-length information corresponding to the focal length of a photographic lens. The object-distance information detecting section detects information corresponding to a distance to the object. The main flash amount calculating section calculates a main flash amount upon photographing in accordance with information obtained at least from the photometry section, the focal-length information detecting section, and the object-distance information detecting section. When the focal-length information indicates a focal length shorter than a first focal length, the main flash amount calculating section makes a wide-angle side dimming correction to reduce the main flash amount. Accordingly, such an effect can be expected that even when a photographic lens having a short focal length is used, flashing can be controlled stably and with accuracy.

In the camera system according to the aforementioned aspect, the wide-angle side dimming correction is preferably made to reduce the main flash amount by a certain amount. In this case, such an effect can be expected that an overexposure on the wide-angle side is readily and positively prevented.

The camera system according to the aforementioned aspect may preferably be configured as follows. First, the main flash amount calculating section estimates a reflectance of the object in accordance with information obtained from the photometry section and the object-distance information detecting section. Secondly, when a focal length indicated by the focal-length information is longer than a second focal length which is longer than the first focal length, and an estimated reflectance is less than a first reflectance, the main flash amount calculating section makes a telescopic-side dimming correction to reduce the main flash amount in proportion to the excess amount below the first reflectance.

The camera system according to the aforementioned aspect may preferably be configured as follows. That is, when a focal length indicated by the focal-length information is longer than the second focal length, and an estimated reflectance is greater than a second reflectance, the main flash amount calculating section makes the telescopic-side dimming correction to increase the main flash amount in proportion to the excess amount above the second reflectance. This makes it possible to expect such an effect that flashing is properly controlled even on the telescopic side. For example, the estimated reflectance of an object may also be referred to as RefMain.

The camera system according to the aforementioned aspect may preferably be configured as follows. That is, when the focal-length information indicates a focal length between the first focal length and the second focal length, the main flash amount calculating section mixes a dimming correction amount given by the wide-angle side dimming correction and a dimming correction amount given by the telescopic-side dimming correction at a ratio corresponding to the focal-length information to determine a dimming correction amount, thereby correcting the main flash amount based on the determined dimming correction amount. This makes it possible to expect such an effect that flashing is appropriately controlled for all focal lengths.

According to another aspect of the present invention, a camera system includes a light emitting section, a photometry section, a focal-length information detecting section, an object-distance information detecting section, and a main flash amount calculating section. The light emitting section is capable of emitting a preflash prior to a main flash upon photographing. The photometry section is capable of measuring reflected light from an object upon emitting the preflash at each of a plurality of photometric regions provided by dividing a photographic region. The focal-length information detecting section detects focal-length information corresponding to a focal length of a photographic lens. The object-distance information detecting section detects information corresponding to a distance to the object. The main flash amount calculating section calculates a main flash amount upon photographing in accordance with information obtained at least from the photometry section, the focal-length information detecting section, and the object-distance information detecting section. Furthermore, the main flash amount calculating section estimates a reflectance of the object in accordance with information obtained from the photometry section and the object-distance information detecting section. When the focal-length information indicates a focal length shorter than a third focal length Fa, the main flash amount calculating section performs a wide-angle side flash amount calculation to increase a contribution ratio of a photometric region with a maximum estimated reflectance and thereby determines the main flash amount. Accordingly, such an effect can be expected that even when a photographic lens having a short focal length is used, flashing is controlled stably and with accuracy.

The camera system according to the aforementioned aspect may preferably be configured as follows. That is, when a focal length indicated by the focal-length information is longer than a fourth focal length Fb which is longer than the third focal length Fa, the main flash amount calculating section performs a telescopic-side flash amount calculation to reduce contribution ratios of "the photometric region with an estimated reflectance being lower than a third reflectance Ra" and "the photometric region with an estimated reflectance being higher than a fourth reflectance Rb" and thereby determines the main flash amount. This makes it possible to expect such an effect that flashing is properly controlled even on the telescopic side. For example, as used here, the estimated reflectance of an object may also be referred to as RefEv[ch].

The camera system according to the aforementioned aspect may preferably be configured as follows. That is, when the focal-length information indicates a focal length between the third focal length Fa and the fourth focal length Fb, the main flash amount calculating section determines the main flash amount so that the determined result corresponds to a flash amount provided by mixing a calculated result from the wide-angle side flash amount calculation and a calculated result from the telescopic-side flash amount calculation at a ratio associated with the focal-length information. This makes it possible to expect such an effect that flashing is appropriately controlled for all focal lengths.

The nature, principle, and utility of the invention will become more apparent from the following detailed description when read in conjunction with the accompanying drawings in which like parts are designated by identical reference numbers.

DESCRIPTION OF THE PREFERRED EMBODIMENTS

First Embodiment

Figure 1:
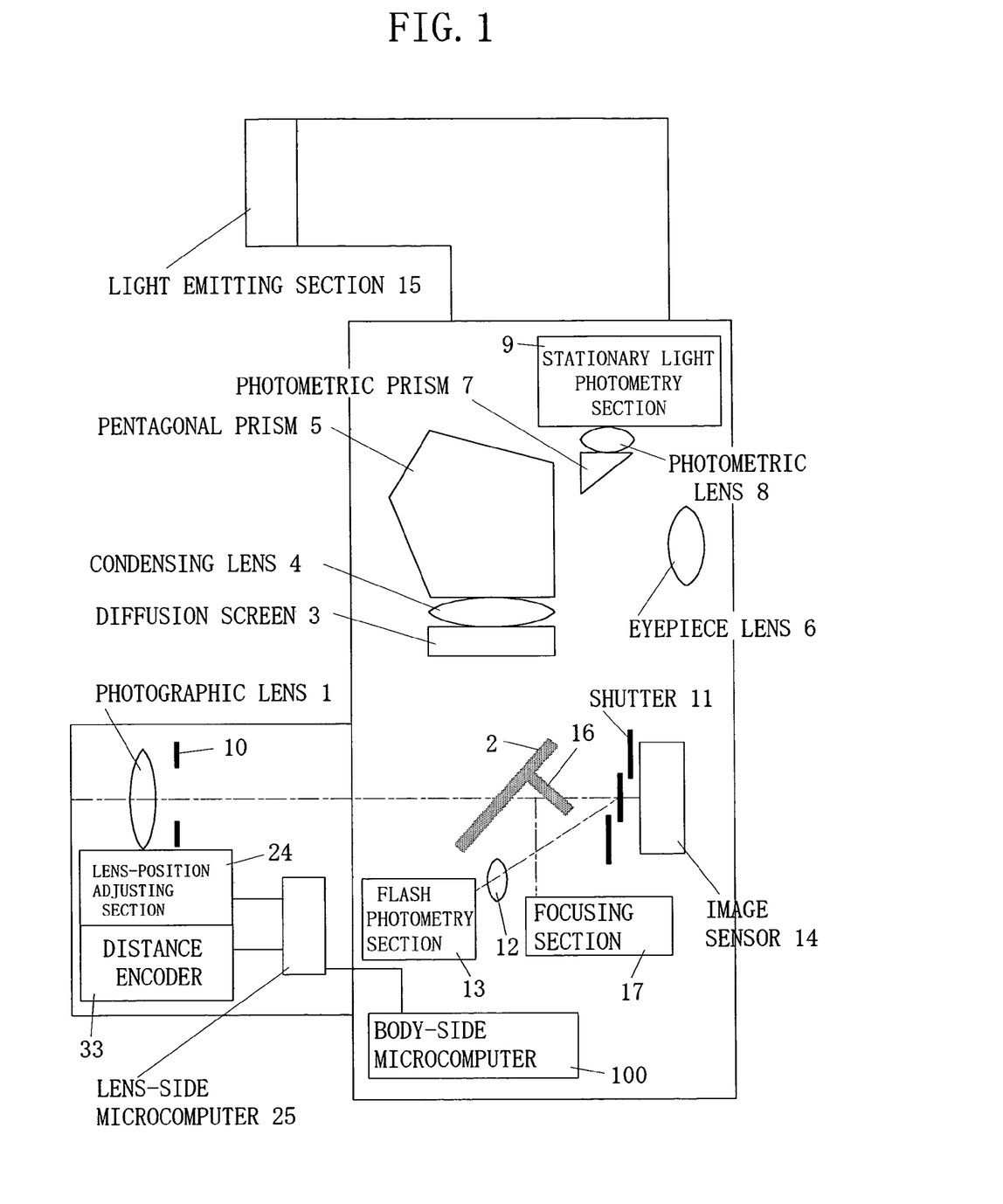
FIG. 1 is a block diagram illustrating a camera system according to a first embodiment of the present invention.

FIG. 1 schematically shows a camera system according to a first embodiment of the present invention. A luminous flux having passed through a photographic lens 1 is bent by a quick return mirror 2 and then focused once on a diffusion screen 3. Subsequently, the flux reaches an eye of a photographer through a condensing lens 4, a pentagonal prism 5, and an eyepiece lens 6. On the other hand, part of the luminous flux diffused by the diffusion screen 3 is re-focused on a stationary light photometry section 9 through the condensing lens 4, the pentagonal prism 5, a photometric prism 7, and a photometric lens 8.

Upon photographing, an aperture 10 is reduced to a predetermined value, and the quick return mirror 2 is lifted up at the same time. At the time of a subsequent preflash emitted by a light emitting section 15, the flux is generally focused on a shutter 11, and part of the flux reflected is re-focused on a flash photometry section 13 through a dimming lens 12. Upon emitting a main flash by the light emitting section 15, the shutter 11 is opened, so that the luminous flux is focused on the light-receiving surface of an image sensor 14 which is made up of CCDs, for example.

The quick return mirror 2 is a half-mirror which partially transmits light, thus allowing part of a transmitted luminous flux to be bent downwardly by a submirror 16 and then directed to a focusing section 17. The focusing section 17 detects the focus condition of any one of the field regions F1 to F5 (see FIG. 2 to be referred to later). In accordance with the focus condition detected by the focusing section 17, a lens-side microcomputer 25 causes a motor in a lens-position adjusting section 24 to drive the lens optical system of the photographic lens 1. This drive operation is continued until focus is achieved.

The photographic lens 1 is provided with a distance encoder 33 which supports the amount of its feed and outputs a signal corresponding to the rotational angle of the focusing ring. In focus, a signal is output corresponding to the distance to the object. That is, the distance encoder 33 acts as an object-distance information detecting section. The lens-side microcomputer 25 processes "the signal corresponding to the distance to the object" to produce a photographic distance signal. This photographic distance signal is communicated to a body-side microcomputer 100 (a body-side flash controlling device) via an electric contact between the camera body and the lens. The focal-length information on the photographic lens 1 is also conveyed from the lens-side microcomputer 25 to the body-side microcomputer 100. That is, the lens-side microcomputer 25 and the body-side microcomputer 100 also act as a focal-length information detecting section. In the body-side microcomputer 100, various calculations and control operations are performed.

Figure 2:
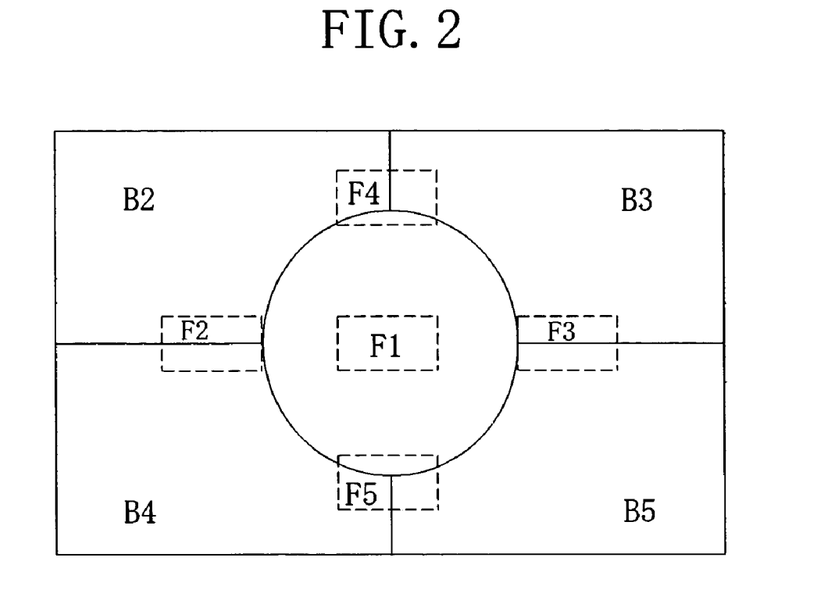
FIG. 2 illustrates photometric regions provided by a stationary light photometry section 9 and focused regions provided by a focusing section 17.

FIG. 2 shows the photometric regions provided by the stationary light photometry section 9 and the focused regions provided by the focusing section 17. For example, the photometric sensor in the stationary light photometry section 9 includes a light receiving device such as a silicon photodiode (hereinafter referred to as SPD). As illustrated, the stationary light photometry section 9 divides the field into five regions B1 to B5 for photometry, being capable of delivering the photometric value of the respective region. The regions F1 to F5, indicated by dashed lines in the figures are the focused regions provided by the focusing section 17.

Figure 3:
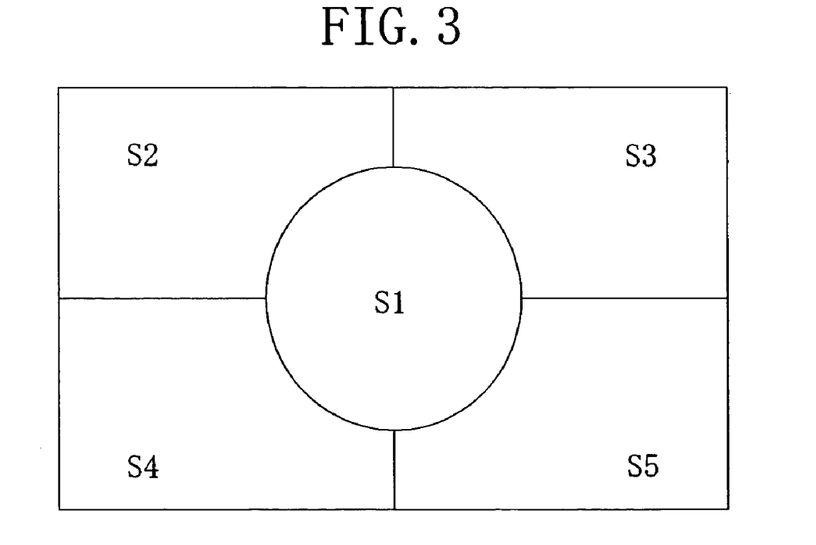
FIG. 3 illustrates photometric regions provided by a flash photometry section 13.

FIG. 3 illustrates the photometric regions provided by the flash photometry section 13. The flash photometry section 13 includes an SPD, a capacitor for accumulating photocurrent from the SPD, and an amplifier for amplification. As illustrated, the flash photometry section 13 has a divided shape generally the same as the photometric sensor for stationary light, with the regions S1 to S5 corresponding to the B1 to B5 of FIG. 2, respectively. The flash photometry section 13 multiplies the photocurrent produced in the SPD by amplification gains varying from one area to another to accumulate the amplified current in an integrating capacitor. When read out, the charge accumulated in the capacitor corresponding to each area is read out as a voltage value and then captured by the body-side microcomputer 100 as digital data by means of an A/D converter included in the microcomputer.

Now, the operation of the camera system according to the first embodiment will be outlined below. A half depression of a release switch (not shown) causes the stationary light photometry section 9 to measure object luminance, while allowing the body-side microcomputer 100 to compute a shutter speed and an f number in accordance with the object luminance. On the other hand, the focusing section 17 detects the amount of defocus, and drives the lens-position adjusting section 24 to achieve focus. The distance encoder 33 detects the rotational angle of the lens focusing ring (corresponding to the amount of feed of the photographic lens 1), thereby acquiring the distance information (the object-distance information) on the object which is focused by the photographic lens 1. This object-distance information is transferred from the lens-side microcomputer 25 to the body-side microcomputer 100 via an electric contact.

A full depression of the release switch will cause a release sequence to start. In the release sequence, the quick return mirror 2 is first lifted up and the aperture 10 is reduced, thereafter an instruction requesting a preflash being delivered to the light emitting section 15. Following this instruction, the light emitting section 15 emits a preflash. In sync with this operation, the flash photometry section 13 measures the intensity of reflected light from the object (relative to the preflash). After the preflash, the flash photometry section 13 also measures stationary light with the same gain and accumulation time as for the preflash. This is done to subtract the photometric value of the stationary light from the intensity of reflected light and thereby measure the net flash reflected light. In accordance with the resulting preflash photometric value, the main flash amount is calculated (to be further described later). Subsequently, the body-side microcomputer 100 causes the shutter 11 to open, while sending the calculated main flash amount and the instruction for the main flash to the light emitting section 15. Accordingly, the light emitting section 15 emits a flash with the main flash amount. Subsequently, after a necessary period of time for a shutter speed has elapsed, the shutter 11 is closed, the quick return mirror 2 is lowered, and the aperture is opened to terminate the release sequence.

Figure 4:
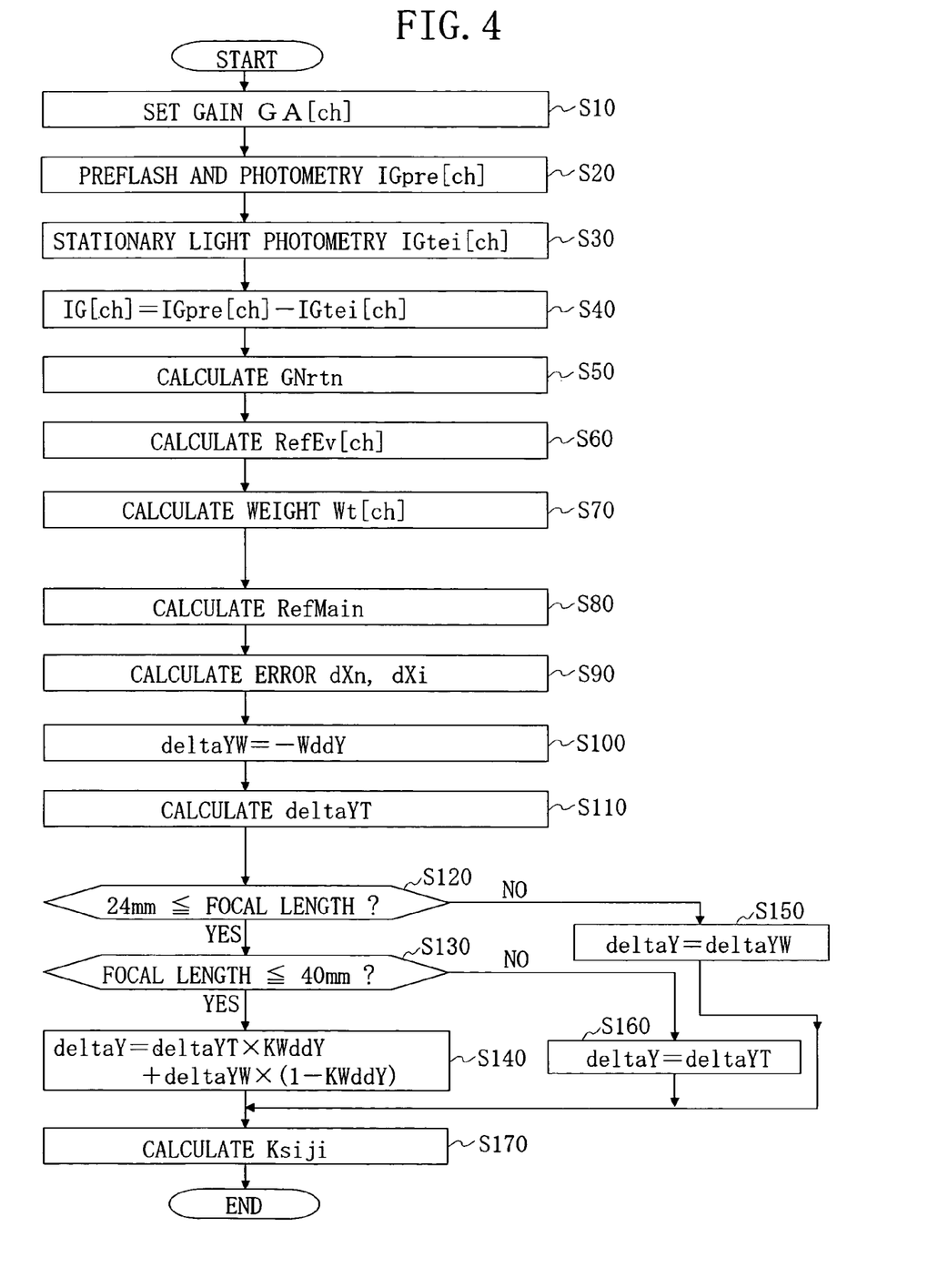
FIG. 4 is a flowchart for calculating a main flash amount according to the first embodiment.

Now, detailed below is the calculation for determining the main flash amount in accordance with the photometric value of flash reflected light upon emitting a preflash (preflash photometric value). FIG. 4 is a flowchart showing the flow of the calculation of the main flash amount according to the first embodiment, which will be explained below according to the step numbers indicated in the figure. The operations shown in FIG. 4 are carried out by the body-side microcomputer 100. That is, the body-side microcomputer 100 acts as a main flash amount calculating section.

[Step S10] Prior to the measurement of a preflash, the gain GA [ch] of each photometric region of the flash photometry section 13 is set. Here, [ch] is any one of S1 to S5, showing which one of the photometric regions S1 to S5 in FIG. 3 the gain is associated with.

[Step S20] An instruction is given to the light emitting section 15 to emit a preflash. At the same time that the light emitting section 15 emits a preflash, the flash photometry section 13 is driven to accumulate charges obtained through photoelectric conversion of the reflected light from the object, thereby providing a preflash photometric value IGpre [ch]. When a sufficient amount of photometric signals have been accumulated, a preflash stop signal is sent to the light emitting section 15 to terminate the preflash. After that, a preflash guide number GNpre emitted during the preflash is communicated from the light emitting section 15 to the body-side microcomputer 100 via an electric contact.

[Step S30] The flash photometry section 13 measures stationary light in the absence of preflash with exactly the same gain and accumulation time as for the measurement of the preflash photometric value, thereby providing a stationary light photometric value IGtei[ch].

[Step S40] The net preflash photometric value IG[ch] is determined by the following equation (1) for each photometric region;

$$IG[ch]=IGpre[ch]-IGtei[ch] \quad (1),$$

where IG[ch] is not to be less than a predetermined value. That is, when IG[ch] is less than a predetermined value, all the values are set (clipped) at the predetermined value.

[Step S50] In accordance with IG[ch] and gain GA, it is calculated for each photometric region what guide number of light emission should be provided by the main flash to obtain an adequate exposure. This is to be referred to as GNrtn[ch]. GNrtn[ch] is determined by the following equation (2):

$$GNrtn[ch] = GNpre \times \sqrt{\frac{GA[ch] \times Const[ch]}{IG[ch]}}. \quad (2)$$

In the equation (2), Const[ch] is a positive adjusted value which is determined so that GNrtn[ch] takes an appropriate value under a standard condition.

GNrtn[ch] determined by the equation (2) is expressed in guide numbers. This GNrtn[ch] indicates the guide number, at which exposure amounts in the five photometric regions S1 to S5 reach a standard amount of image plane exposure, i.e., the one at which each of the photometric regions S1 to S5 is optimally photographed. Therefore, a photometric region with a greater GNrtn[ch] has a less amount of reflected light from the object, whereas a photometric region with a less GNrtn[ch] has a larger amount of reflected light from the object.

[Step S60] Based on the GNrtn[ch], the distance information Xm obtained from the distance encoder 33, and the APEX value Av of an aperture control value, the logarithmic value RefEv[ch], whose base is 2, for the object reflectance of each region is estimated by the equation (3) below:

$$RefEv[Ch]=\{\log_{\sqrt{2}}(Xm)\}+Av-\log_{\sqrt{2}}(GNrtn[ch]) \quad (3).$$

A RefEv[ch] being zero means the standard reflectance, +1 means a reflectance higher by one grade, and −1 means a reflectance lower by one grade.

Figure 5:
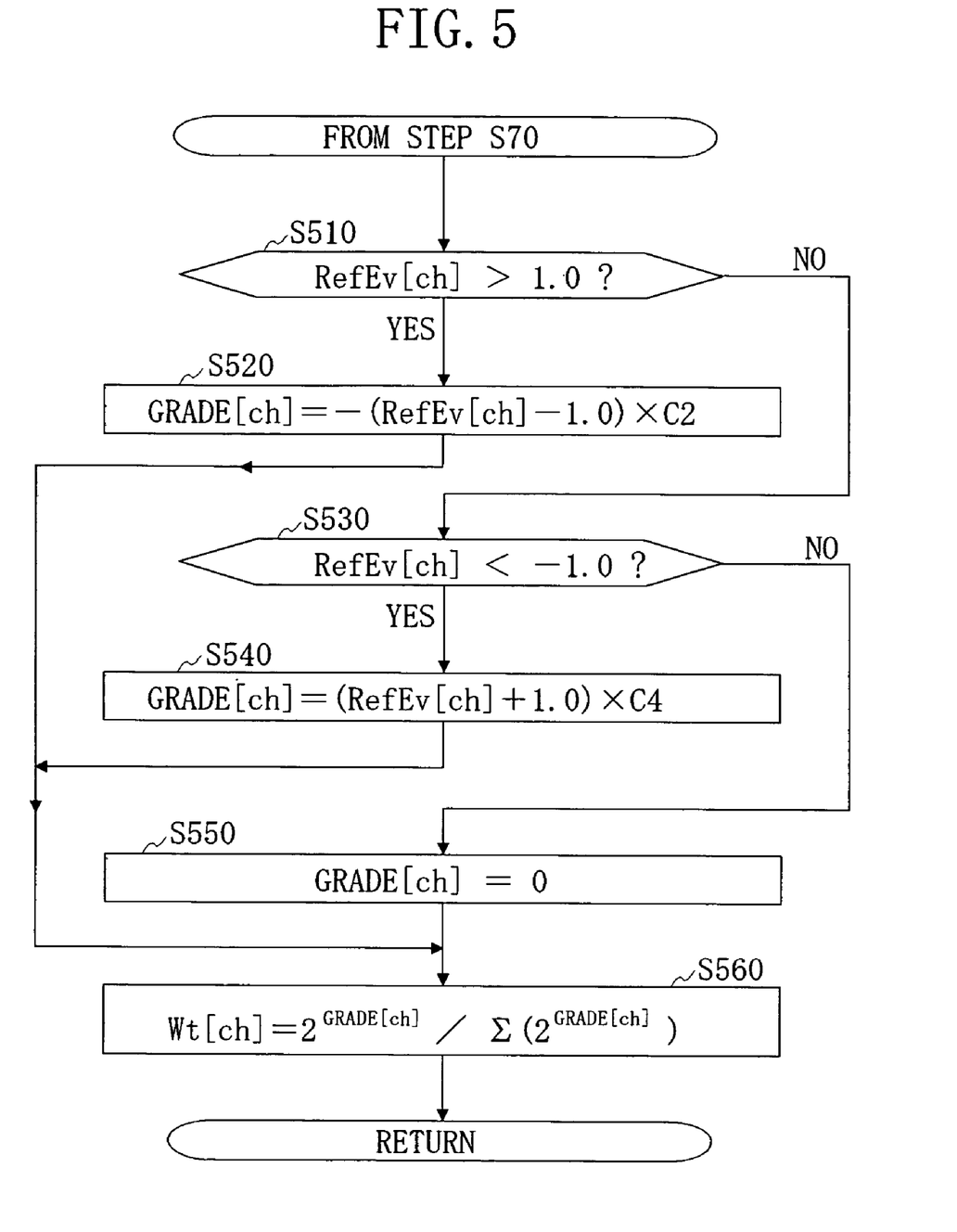
FIG. 5 is a flowchart showing a detailed calculation for determining a weight Wt[ch] in S70 of FIG. 4.

[Step S70] Based on the RefEv[ch], the contribution ratio to the determination of the main flash amount is determined as weight Wt[ch] for each photometric region. FIG. 5 is a flowchart showing a detailed calculation for determining weight Wt[ch] in step S70. Here, a method for determining the Wt[ch] according to the step numbers shown in FIG. 5 will be described first, and an explanation will then be given again with reference to FIG. 4.

[Step S510] The process determines whether RefEv[ch] is greater than 1.0. If the RefEv[ch] is greater than 1.0, the process proceeds to step S520, or if not, to step S530.

[Step S520] The process computes GRADE[ch] according to the equation (4) below, and then proceeds to step S560. In the equation (4), C2 is a positive constant.

$$GRADE[ch]=-(RefEv[ch]-1.0)\times C2 \quad (4).$$

The GRADE[ch] is a variable indicative of how many grades of weight each photometric region has relative to the other photometric regions. In this embodiment, for the reflectance logarithmic value RefEv[ch] being greater or less than a predetermined value, "an excess amount in RefEv[ch] above a predetermined value" is multiplied by a gradient (C2, or C4 in equation (5) discussed later) to lower the GRADE[ch]. Here, as an exemplary predetermined value, 1.0 from step S510 and −1.0 from step S530 are employed for setting.

[Step S530] The process determines whether RefEv[ch] is less than −1.0. If the RefEv[ch] is less than −1.0, then the process proceeds to S540, or if not, to S550.

[Step S540] The process computes GRADE[ch] according to the equation (5) below and then proceeds to step S560. In the equation (5), C4 is a positive constant.

$$GRADE[ch]=(RefEv[ch]+1.0)\times C4 \quad (5).$$

[Step S550] If $-1.0 \leq RefEv[ch] \leq 1.0$, then the process reaches this step. Here, it is assumed that GRADE[ch]=0.

[Step S560] As shown in equation (6) below, the GRADE [ch] is converted into an antilogarithm and normalized, thereby determining the weight Wt[ch] of each region.

$$Wt[ch]=2^{GRADE[ch]}/\{\Sigma(2^{GRADE[ch]})\} \quad (6).$$

In the equation (6), Σ( ) indicates the total sum of what is in ( ) for [ch]=S1 to S5 (this holds also true for the subsequent equations such as equation (7)). Therefore, it holds that Wt[S1]+Wt[S2]+Wt[S3]+Wt[S4]+Wt[S5]=1. An adjustment made to the contribution ratio of each photometric region in the calculation of the main flash amount according to the weight Wt[ch] would eliminate the effects of the estimated region having an abnormal reflectance. The method for computing the Wt[ch] has been completely described. Now, an explanation is given again with reference to FIG. 4.

[Step S80] In step S80, the dimming correction amount is automatically calculated in accordance with the logarithmic value RefEv[ch], whose base is 2, for the object reflectance of each estimated region, to determine an appropriate exposure. More specifically, the weight Wt[ch] is taken into account to determine an entire reflectance estimated value RefMain according to the equation (7) below.

$$RefMain=\log_2\{\Sigma(Wt[ch]\times 2^{RefEv[ch]})\} \quad (7).$$

If the RefMain indicates "+", the main object conceivably has a high reflectance, whereas if the RefMain indicates "−", the main object has a low reflectance.

[Step S90] In this step, the process determines an infinite-side error (first reflectance) dXi and a proximate-side error (second reflectance) dXn at the estimated object reflectance. More specifically, the focal length and the distance detection error information (two pieces of infinite-side and proximate-side information) corresponding to the distance encoder position are sent as a value unique to the lens employed from the lens-side microcomputer 25 to the body-side microcomputer 100. This causes the body-side microcomputer 100 to calculate the total error information, which includes the distance detection error information, and which is likely contained in the calculation of reflectance.

Assume that the infinite-side distance detection error information communicated from the lens-side microcomputer 25 is dXiL, and the proximate-side distance detection error is dXnL, with them being expressed in the number of APEX (additive system of photographic exposure) value grades.

That is, dXiL assumed to take on a +1.0 grade means that an error is allowed up to the square root of two times the detected distance. On the other hand, dXnL assumed to take on a +1.0 grade means that an error is allowed up to the $1/\sqrt{2}$ times the detected distance. The process computes the infinite-side focus detection error dXiB and the proximate-side focus detection error dXnB according to equation (8) below. The equation (8) is an approximation which estimates what level of error the lens distance information can have considering the lens focal length and photographic distance when focus is achieved by auto focusing with the defocus amount tolerance of the image plane being set at a certain value.

$$dXiB=C6 \times Xm/(Fmm \times Fmm)$$

$$dXnB=C7 \times Xm/(Fmm \times Fmm) \qquad (8).$$

In the equation above, Xm is the object-distance information obtained from the lens, Fmm is the focal length of the photographic lens, and C6 and C7 are positive constants. It is also defined that the accuracy (error) of preflash is dXmon. In this embodiment, by way of example, dXmon is fixed to a ⅓ grade. It is defined that the total proximate-side error including the aforementioned various error factors is dXn and the infinite-side error is dXi. These errors are calculated by equation (9) below.

$$dXi=(dXiL+dXiB+dXmon)/1.8$$

$$dXn=(dXnL+dXnB+dXmon)/1.8 \qquad (9).$$

[Step S1001] For the focal length being on the wide angle side, −WddY is set as the dimming correction amount deltaYW. Here, the focal length being on the wide angle side means a case in which the focal length is less than a predetermined value (first focal length). In this embodiment, by way of example, the first focal length is 24 mm. On the other hand, the WddY is given a predetermined value in advance as a value for dimming correction to be made on the wide-angle side. That is, on the wide-angle side, the dimming amount is always reduced by a certain value.

On the wide-angle side, not for proximate photographing but for a depth being present in a portrait background, no dimming correction may cause overexposure as described above. It is thus made possible to provide an appropriate exposure by reducing the dimming amount by a certain amount.

On the other hand, on the wide-angle side, for a planar object being photographed, the distance from the light emitting section to the object is different between at the screen center and at the periphery of the screen. That is, the distance from the light emitting section is closer at the center of the screen, whereas being farther at the periphery. In such a scene, averaged weights are assigned to the dimming regions. Accordingly, an inappropriate dimming correction made in such a scene would cause control to be provided to optimize the level of the entire screen, resulting in the center of the screen being slightly overexposed. For this reason, on the wide-angle side, the dimming amount is reduced by a certain value as the dimming correction amount, thereby avoiding the overexposure to optimize the exposure.

Figure 6:
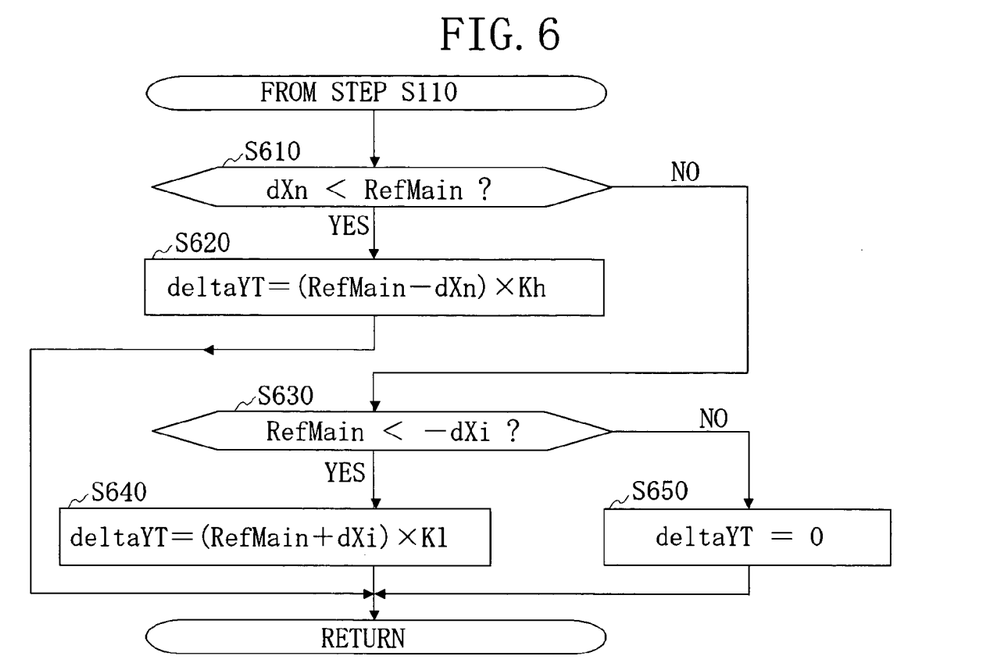
FIG. 6 is a flowchart showing a detailed calculation for determining a dimming correction amount delta YT.

[Step S110] The process computes a dimming correction amount deltaYT when the focal length is on the telescopic side (telescopic-side dimming correction). FIG. 6 is a detailed flowchart showing a computing operation for determining the dimming correction amount deltaYT. Here, a method for computing the dimming correction amount deltaYT according to the step numbers shown in FIG. 6 will be explained first, and an explanation will then be given referring back to FIG. 4.

[Step S610] The process determines whether RefMain is greater than dXn. If the RefMain is greater than dXn, then the process proceeds to step S620, or if not, to step S630.

[Step S620] The process determines the dimming correction amount deltaYT according to equation (10) below, and then returns (to step S120 of FIG. 4).

$$deltaYT=(RefMain-dXn) \times Kh \qquad (10).$$

When RefMain is greater than dXn, this provides a positive correction to the dimming correction amount deltaYT in proportion to the excess amount above dXn. In the equation (10), Kh is a proportionality factor which is equal to or greater than zero. For dXn being larger, the proportionality factor Kh is reduced (for more detail, see step S640 to be discussed later).

[Step S630] The process determines whether RefMain is less than dXi. If the RefMain is less than dXi, then the process proceeds to step S640, or if not, to step S650.

[Step S640] The process determines the dimming correction amount deltaYT according to equation (11) below as a telescopic minus dimming correction, and then returns.

$$deltaYT=(RefMain+dXi) \times KI \qquad (11).$$

When RefMain is less than −dxi, this provides a minus dimming correction amount in proportion to the excess amount below −dxi. In the equation (11), KI is a proportionality factor which is equal to or greater than zero. For dXn being larger in the aforementioned step S620, and dXi being larger in this step S640, the proportionality factors KI and Kh are reduced.

More specifically, if the value of dXn is equal to or less than a 0.3 grade (for an insignificant error), then Kh=1.0 in the aforementioned step S620. If the value of dXi is equal to or less than a 0.3 grade (for an insignificant error), then KI=1.0 in this step S640. If the value of dXn and dXi is two grades or more, then Kh and KI are assumed to be zero. Between 0.3 grades and 2.0 grades of the value of dXn and dXi, a determination is made to provide a smooth change as expressed by the following equation (12). This makes it possible to prevent an excessive correction in the case of the error information being indicative of a significant error.

$$Kh=(2.0-dXn)/1.7$$

$$KI=(2.0-dXi)/1.7 \qquad (12).$$

[Step S650] If −dXi≦RefMain≦dXn, then the process reaches this step. In this case, the dimming correction amount deltaYT is set to zero or so that a dimming correction is not to be made, and the process then returns. As described above, the dimming correction amount deltaYT has been explained, and an explanation will be now given below referring back to FIG. 4.

[Step S120] The process determines whether the focal length of the photographic lens 1 is greater than or equal to 24 mm (first focal length). If the focal length is greater than or equal to 24 mm, then the process proceeds to step S130, or if not, to step S150.

[Step S130] The process determines whether the focal length of the photographic lens 1 is less than or equal to a second focal length. In this embodiment, by way of example, the second focal length is assumed to be 40 mm. If the focal length is less than or equal to 40 mm, then the process proceeds to step S140, or if not, to step S160.

[Step S140] If the process proceeds to step S140, then the focal length of the photographic lens 1 falls between greater or equal to 24 mm and less or equal to 40 mm. In this case, the dimming correction amount deltaYW on the wide-angle side and the dimming correction amount deltaYT on the telescopic side are mixed at a ratio corresponding to the focal length of the photographic lens 1 to determine the dimming correction amount. More specifically, the dimming correction amount deltaY is determined according to equation (13) below.

$$deltaY = deltaYT \times KwddY + deltaYW \times (1-KWddY) \quad (13)$$

Figure 7:
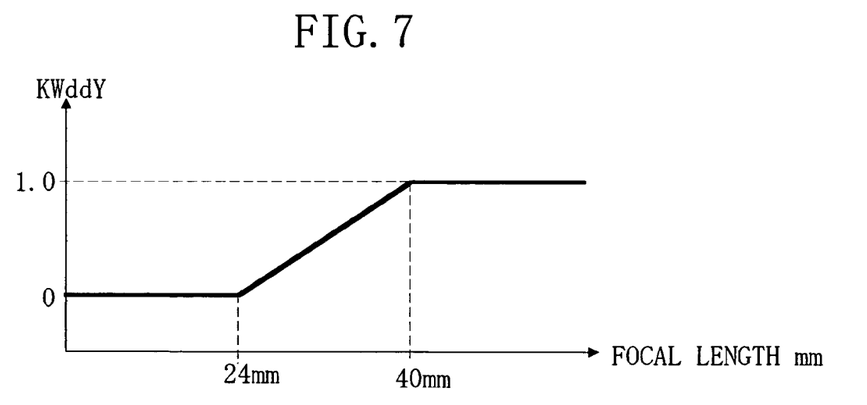
FIG. 7 shows a change in KWddY.

The KWddY in the equation (13) is a variable indicative of "the ratio corresponding to the focal length". FIG. 7 shows an example of a change in KWddY. In this embodiment, by way of example, it is assumed that KWddY is zero on the wide-angle side (with the focal length being less than 24 mm) and one on the telescopic side (over a range above a focal length of 40 mm), being varied smoothly from zero to one therebetween. Now, a reference is made referring back to FIG. 4.

[Step S150] The process sets the dimming correction amount deltaY to the dimming correction amount deltaYW, and then proceeds to step S170. This allows a minus correction to be made always by a certain value (WddY) on the wide-angle side. As described above with reference to the conventional technique, a great depth of field on the wide-angle side causes the focusing ring to stop varyingly within a relatively wide range, and thus the object-distance information obtained from the distance encoder and the accompanying object distance detection error information are also varied. For this reason, even if the dimming correction amount is calculated in the same manner as for the telescopic side, its value is also varied. Accordingly, in this embodiment, the dimming correction amount on the wide-angle side is set at a certain value irrespective of the distance data and the distance error data (−WddY in step S100).

[Step S160] The process sets the dimming correction amount deltaY to the dimming correction amount deltaYT, and then proceeds to step S170.

[Step S170] A flash amount instruction value Ksiji, which indicates how many times greater the main flash amount should be than the preflash amount, is determined according to equation (14) below.

$$Ksiji = \frac{2^{deltaY}}{GNpre^2 \times \sum (Wt[ch]/GNrtn[ch]^2)}. \quad (14)$$

Instead of this calculation, an equivalent calculation may also be performed with logarithms of each variable. This calculation is based on the assumption that the ISO value or the sensitivity of the image sensor 14 is 100, and thus not taken into account when the sensitivity is changed. In this case, the sensitivity is separately communicated to the light emitting section 15 side. The light emitting section 15 is controlled to provide a flash amount reduced by one grade if the sensitivity is higher than ISO100 by one grade. Of course, the sensitivity may also be taken into account in the calculation in the body-side microcomputer 100.

After the calculation of the flash amount instruction value Ksiji, the resulting flash amount instruction value Ksiji or its logarithmic value is transmitted to the light emitting section 15 via the electric contact used for communication. The sensitivity is sent periodically to the light emitting section 15. Upon emitting a preflash, the light emitting section 15 counts the flash amount of the preflash using a flash photometric sensor included therein. Upon emitting a main flash, the light emitting section 15 provides control so as to emit a flash amount which is Ksiji times "the count indicative of the flash amount upon emitting the preflash". That is, the light emitting section 15 provides control so as to allow its flash photometric sensor to start measuring the flash amount of the main flash as a count value at the same time the main flash is commenced, and terminate the flash when the count value has reached a Ksiji times that of the preflash. At this time, the aforementioned sensitivity is taken into account. Let the sensitivity be expressed by the SV of the APEX value and the preflash guide number measured by the light emitting section 15 be expressed by GNpre. In this case, the intensity GNhon of the main flash emitted by the light emitting section 15 is controlled so that the following equation (15) holds.

$$GNhon^2 = (GNhon'2) \times Ksiji \times 2^{(5-SV)} \quad (15).$$

In the above equation, the 5 in the exponent (5-SV) is the reference IS0100 expressed by the SV of the APEX value. As described above, on the telescopic side, this embodiment provides the dimming correction based on the reflectance calculation using the object-distance information and the object distance detection error information. On the wide-angle side, the dimming amount is reduced by a certain value without using the object-distance information and the object distance detection error information. Accordingly, it is possible to prevent overexposure upon photographing with flash on the wide-angle side, providing an appropriately exposed photograph.

Second Embodiment

In the first embodiment, such a technique has been described in which the dimming correction amount is changed according to the focal length, and particularly the flash amount is appropriately controlled upon wide-angle photographing. In contrast to this, in addition to the technique of the first embodiment, the second embodiment allows the weight of the photometric regions to be changed according to the focal length in order to more appropriately control the flash amount upon wide-angle photographing. Accordingly, the second embodiment is the same as the first embodiment except that the operation in step S70 of FIG. 4 of the first embodiment is differently performed. Thus, the portions having the same function as those of the first embodiment are indicated with the same symbols and will not be explained repeatedly.

Figure 8:
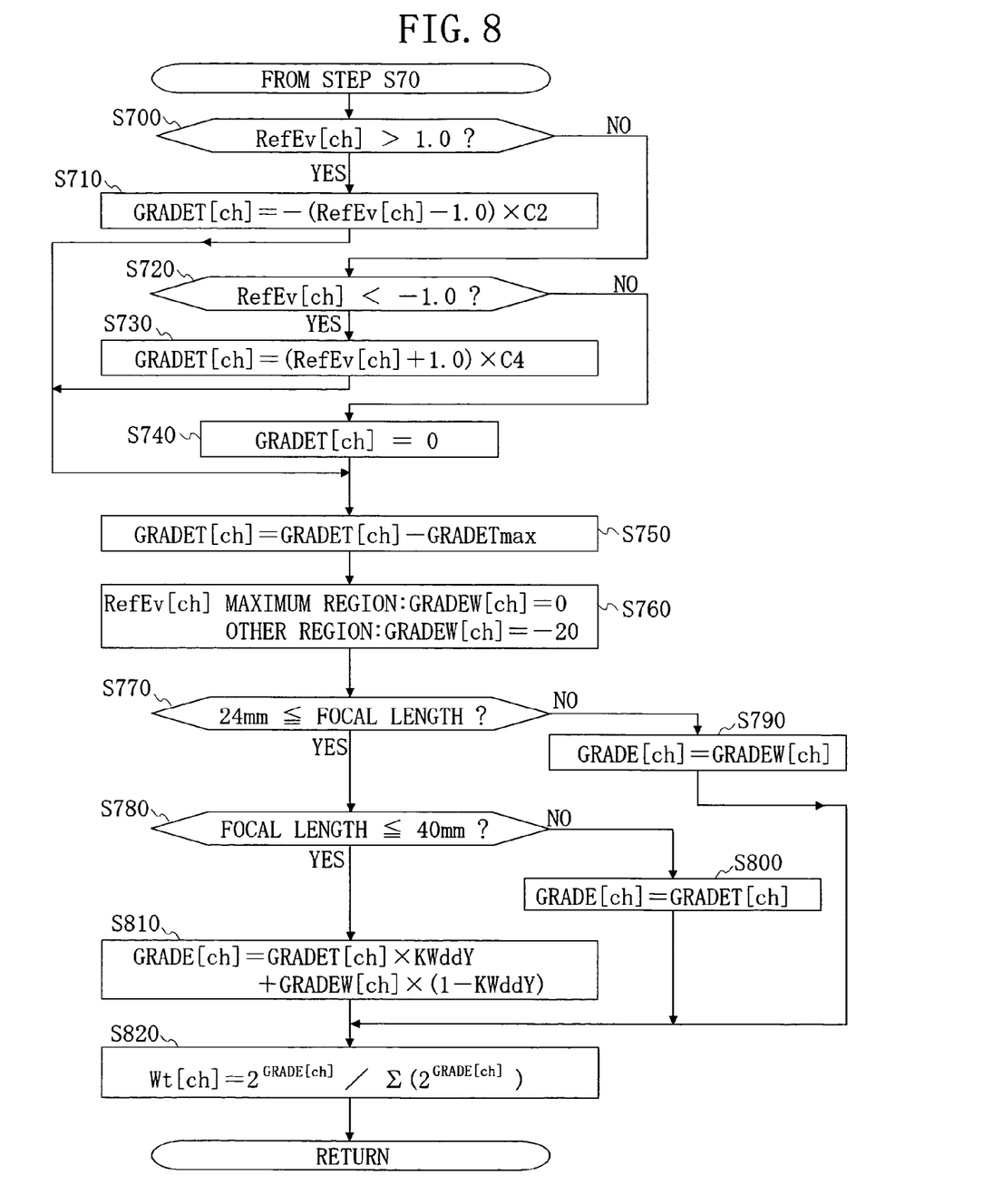
FIG. 8 is a flowchart showing a detailed calculation for determining a weight Wt[ch] of a second embodiment.

FIG. 8 is a detailed flowchart showing a calculation operation for determining the weight Wt[ch] according to the second embodiment. Now, the operation will be explained according to the step numbers in FIG. 8.

[Step S700] The process determines whether the reflectance logarithmic value RefEv[ch] is greater than a fourth reflectance Rb. In this embodiment, by way of example, the fourth reflectance Rb is assumed to be 1.0. If the reflectance logarithmic value RefEv[ch] is greater than 1.0, then the process proceeds to step S710, or if not, to step S720.

[Step S710] The process computes GRADET[ch] according to equation (16) below.

$$GRADET[ch] = -(RefEv[ch] - 1.0) \times C2 \quad (16).$$

In the equation (16), and equation (17) shown below, C2 and C4 may be the same as those of the first embodiment.

[Step S720] The process determines whether the reflectance logarithmic value RefEv[ch] is less than a third reflectance Ra. In this embodiment, by way of example, the third reflectance Ra is assumed to be −1.0. If the reflectance logarithmic value RefEv[ch] is less than −1.0, then the process proceeds to step S730, or if not, to step 5740.

[Step S730] The process calculates the GRADET[ch] according to the following equation (17).

$$GRADET[ch] = (RefEv[ch] + 1.0) \times C4 \quad (17).$$

The operation for determining the GRADET[ch] on the telescopic side in the aforementioned steps S700 to S740 is the same as that for determining the GRADE[ch] in S510 to S550 according to the first embodiment.

[Step S750] The GRADET[ch] indicates the relative weight between each of the photometric regions by the number of grades. However, in preparation for the subsequent calculations, it is normalized in step S750 according to the following equation (18) so that the maximum value is zero.

$$GRADET[ch]=GRADET[ch]-GRADET\text{max} \qquad (18)$$

In the above equation, the GRADETmax is the maximum value within GRADET[S1] to GRADET[S5].

[Step S760] The process defines a wide-angle side variable GRADEW[ch] which has the same meaning as the GRADE[ch] on the wide-angle side. In this embodiment, for a short focal length, the process places greater weight on a photometric region with a larger amount of reflected light from a preflash, while reducing the weight of the other photometric regions. The process defines that GRADEW[ch]=0 for the region with the greatest RefEv[ch] among [ch]=S1 to S5, while defining GRADEW[ch]=−20 for the other regions.

That GRADEW[ch]=−20 is meant to reduce the weight logarithmically by 20 grades, substantially corresponding to the weight equal to zero in the antilogarithmic region. Therefore, the number −20 has no significant meaning and thus this value may be any large negative number.

[Step S770] The process determines whether the focal length of the photographic lens 1 is equal to, or greater than, the third focal length Fa. In this embodiment, by way of example, the third focal length Fa is assumed to be 24 mm. For a focal length being 24 mm or greater, the process proceeds to step S780, or if not, to step S790.

[Step S780] The process determines whether the focal length of the photographic lens 1 is less than or equal to a fourth focal length Fb. In this embodiment, by way of example, the fourth focal length Fb is assumed to be 40 mm. If the focal length is less than or equal to 40 mm, the process proceeds to step S810, or if not, to step S800.

The third and fourth focal lengths Fa and Fb, respectively, used as threshold values in steps S770 and S780 are equal to the first and second focal lengths in the first embodiment, respectively; however, they may also be different from each other.

[Step S790] The process proceeds to step S820 after defining that GRADE[ch]=GRADEW[ch].

[Step S800] The process proceeds to step S820 after defining that GRADE[ch]=GRADET[ch].

[Step S810] The process determines the GRADE[ch] according to the following equation (19).

$$GRADE[ch]=GRADET[ch] \times KWddY+GRADEW[ch] \times (1-KWddY) \qquad (19)$$

In step S810, the focal length of the photographic lens 1 falls between 24 mm or more and 40 mm or less. In this case, the GRADEW[ch] on the wide-angle side and the GRADET[ch] on the telescopic side are mixed at a ratio corresponding to the focal length of the photographic lens 1 to determine the GRADE[ch]. The KWddY in the equation (19) may be the same as the KWddY of the first embodiment and varies according to the focal length as shown in FIG. 7.

[Step S820] By converting the GRADE[ch] into an antilogarithm for normalization, the weight Wt[ch] of each region is determined according to the following equation (20).

$$Wt[ch]=2^{GRADE[ch]}/\Sigma(2^{GRADE[ch]}) \qquad (20).$$

In accordance with the resulting weight Wt[ch], each photometric region is allowed to contribute to the calculation of the main flash amount. Thus, when using a lens with a shorter focal length, the main flash amount can be calculated with greater weight placed on the region having the largest amount of reflected light. This prevents overexposure. On the other hand, when using a lens with a longer focal length, the weight of a "region with abnormally reduced reflected light" and a "region with abnormally increased reflected light like a mirror" is reduced in accordance with the reflectance expectation value, thereby providing an appropriate amount of exposure. For an intermediate focal length, intermediate control between the wide-angle and telescopic sides provides a stable amount of exposure. The operation to be performed after the aforementioned weight Wt[ch] has been determined is the same as that of the first embodiment.

In the second embodiment, when the wide-angle side GRADEW[ch] is set in step S760, the weight of the region with the largest amount of reflected light is maintained, and the weight of the other regions is substantially made zero. However, the present invention is not limited to this technique, and may also be modified as follows.

For a short focal length, the process may place greater weight on a photometric region with a larger amount of reflected light from a preflash, and reduce the weight of the other photometric regions by multiplying the excess amount below the maximum reflectance by a coefficient. For example, the maximum RefEv[ch] among the [ch]=S1 to S5 is assumed to be maxRefEv[ch], and the GRADEW[ch] is determined according to the following equation (21).

$$GRADEW[ch]=(RefEv[ch]-\text{max}RefEv[ch]) \times C5 \qquad (21).$$

In the equation (21), C5 is a positive constant for determining the gradient to reduce the weight. This makes it possible to provide further stabilized control even when the composition of the picture to be shot is slightly changed. According to this embodiment, no overexposure takes place on the wide-angle side upon photographing with a flash, while appropriate dimming can be performed on the telescopic side in accordance with the calculation of reflectance. Furthermore, even when the focal length is between the wide-angle length and the telescopic length, it is possible to perform dimming that would complement the lengths, thereby providing appropriate dimming.

<Supplementary Items of this Invention>

[1] The first and second embodiments are provided with a special sensor for measuring flashes, which measures a preflash from the diffused light on the shutter curtain with the main mirror lifted up. However, such a method is also known in which a sensor for measuring stationary light is shared to measure a preflash for photometry with the mirror lowered. The present invention is also applicable even in this case, because the phenomenon resulting from the relation between the focal length of the lens and the object to be shot is exactly the same.

[2] In addition to the technique of the first embodiment for varying the dimming correction amount according to the focal length, the second embodiment varies the weight of each photometric region. The present invention is not limited thereto, and may also independently perform the technique for varying the weight of each photometric region according to the focal length.

The invention is not limited to the above embodiments and various modifications may be made without departing from the spirit and scope of the invention. Any improvement may be made in part or all of the components.

What is claimed is:

1. A camera system comprising:
   a light emitting section capable of emitting a preflash prior to a main flash upon photographing;
   a photometry section capable of measuring reflected light from an object upon emitting said preflash;
   a focal-length information detecting section detecting focal-length information corresponding to a focal length of a photographic lens;
   an object-distance information detecting section detecting information corresponding to a distance to said object; and
   a main flash amount calculating section calculating a main flash amount upon photographing in accordance with information obtained at least from said photometry section, said focal-length information detecting section, and said object-distance information detecting section, wherein
   when said focal-length information indicates a focal length shorter than a first focal length, said main flash amount calculating section makes a wide-angle side dimming correction to reduce said main flash amount.

2. The camera system according to claim 1, wherein
   said main flash amount calculating section estimates a reflectance of said object in accordance with information obtained from said photometry section and said object-distance information detecting section, and
   when a focal length indicated by said focal-length information is longer than a second focal length which is longer than said first focal length, and an estimated reflectance is less than a first reflectance, said main flash amount calculating section makes a telescopic-side dimming correction to reduce said main flash amount in proportion to the excess amount below said first reflectance.

3. The camera system according to claim 2, wherein
   when a focal length indicated by said focal-length information is longer than said second focal length, and an estimated reflectance is greater than a second reflectance, said main flash amount calculating section makes said telescopic-side dimming correction to increase said main flash amount in proportion to the excess amount above said second reflectance.

4. The camera system according to claim 3, wherein
   when said focal-length information indicates a focal length between said first focal length and said second focal length, said main flash amount calculating section mixes a dimming correction amount given by said wide-angle side dimming correction and a dimming correction amount given by said telescopic-side dimming correction at a ratio in accordance with said focal-length information to determine a dimming correction amount, thereby correcting said main flash amount based on the determined dimming correction amount.

5. A camera system comprising:
   a light emitting section capable of emitting a preflash prior to a main flash upon photographing;
   a photometry section capable of measuring reflected light from an object upon emitting said preflash at each of a plurality of photometric regions provided by dividing a photographic region;
   a focal-length information detecting section detecting focal-length information corresponding to a focal length of a photographic lens;
   an object-distance information detecting section detecting information corresponding to a distance to said object; and
   a main flash amount calculating section calculating a main flash amount upon photographing in accordance with information obtained at least from said photometry section, said focal-length information detecting section, and said object-distance information detecting section, wherein
   said main flash amount calculating section estimates a reflectance of said object in accordance with information obtained from said photometry section and said object-distance information detecting section, and
   when said focal-length information indicates a focal length shorter than a length Fa, said main flash amount calculating section performs a wide-angle side flash amount calculation to increase a contribution ratio of a photometric region with a maximum estimated reflectance and thereby determines said main flash amount.

6. The camera system according to claim 5, wherein
   when a focal length indicated by said focal-length information is longer than a focal length Fb which is longer than said focal length Fa, said main flash amount calculating section performs a telescopic-side flash amount calculation to reduce a contribution ratio of "said photometric region with an estimated reflectance being lower than a reflectance Ra" and "said photometric region with an estimated reflectance being higher than a reflectance Rb" and thereby determines said main flash amount.

7. The camera system according to claim 6, wherein
   when said focal-length information indicates a focal length between said focal length Fa and said focal length Fb, said main flash amount calculating section determines said main flash amount so that the determined result corresponds to a flash amount provided by mixing a calculated result from said wide-angle side flash amount calculation and a calculated result from said telescopic-side flash amount calculation at a ratio in accordance with said focal-length information.

* * * * *

UNITED STATES PATENT AND TRADEMARK OFFICE
CERTIFICATE OF CORRECTION

PATENT NO. : 7,130,535 B2  
APPLICATION NO. : 10/968141  
DATED : October 31, 2006  
INVENTOR(S) : Hiroshi Takeuchi Page 1 of 1

It is certified that error appears in the above-identified patent and that said Letters Patent is hereby corrected as shown below:

Column 18, Line 28, after "a" insert --focal--.

Signed and Sealed this

Eighth Day of May, 2007

JON W. DUDAS  
*Director of the United States Patent and Trademark Office*